United States Patent [19]
Dionne

[11] Patent Number: 6,068,487
[45] Date of Patent: May 30, 2000

[54] SPELLER FOR READING SYSTEM

[75] Inventor: Mark S. Dionne, Newton, Mass.

[73] Assignee: Lernout & Hauspie Speech Products N.V., Ypres, Belgium

[21] Appl. No.: 09/175,642

[22] Filed: Oct. 20, 1998

[51] Int. Cl.⁷ .............................. G09B 17/00; G09B 19/04
[52] U.S. Cl. ......................... 434/178; 434/185; 704/270; 704/271
[58] Field of Search ..................................... 434/116, 159, 434/161, 178–185; 704/260, 270, 271, 272

[56] References Cited

U.S. PATENT DOCUMENTS 5,875,428  2/1999  Kurzweil et al. ........................ 704/260

*Primary Examiner*—Robert A. Hafer
*Assistant Examiner*—John Edmund Rovnak
*Attorney, Agent, or Firm*—Fish & Richardosn, P.C.

[57] ABSTRACT

A method for having a reading machine spell a word includes retrieving a word to be spelled, displaying the first character of the word on a display while applying a highlighting indicia to the character, synthesizing speech for the character to have the reading machine pronounce the displayed letter of the word, unhighlighting the displayed letter of the word, and retrieving a subsequent letter of the word.

8 Claims, 4 Drawing Sheets

SPELLER FOR READING SYSTEM

BACKGROUND

This invention relates to reading machines which are used as part of a remedial reading program to assist individuals with learning disabilities or severe visual impairments or blindness.

Reading machines have been used to improve the educational attainment of individuals with learning disabilities. They have also been used by persons having visual impairment or blindness. Reading machines often include a personal computer having specialized software that provides a reading machine function to the computer. In addition, the reading machines include other PC type components such as a monitor, an audio system, a disk or mass storage device, and a keyboard. In general, specialized software processes an input source document and generates synthetic speech to enable a user to hear the computer read through the document a word, line, sentence etc. at a time. Often these reading machines include a scanner to provide one technique to input source documents to the reader.

For individuals with learning disabilities such as dyslexia some conventional reading machines provide a speller feature that reads a word which a user desires to spell aloud a single letter at a time.

SUMMARY

According to an aspect of the invention, a method for having a reading machine spell a word includes retrieving a word to be spelled and displaying the first character of the word on a display while applying a highlighting indicia to the character. The method also includes synthesizing speech for the character to have the reading machine pronounce the displayed letter of the word, unhighlighting the displayed letter of the word, retrieving a subsequent letter of the word.

One or more of the following advantages may be provided by the invention. The talking speller feature on reading machines assists people with dyslexia by reinforcing the appearance of the letters one at a time in the string as the letters are being pronounced by the speller. This may improve the learning capabilities of such persons. This process can be extended to work with the other enrichment features. For example, if the machine has a facility to look up synonyms of a word, the machine can spell it and highlight it a letter at a time. The talking speller can display the letters one at a time and highlight them in a separate window or as the letters appear in the original document.

BRIEF DESCRIPTION OF THE DRAWINGS

The foregoing features and other aspects of the invention will be described further in detail by the accompanying drawings, in which.

DETAILED DESCRIPTION

Figure 1:
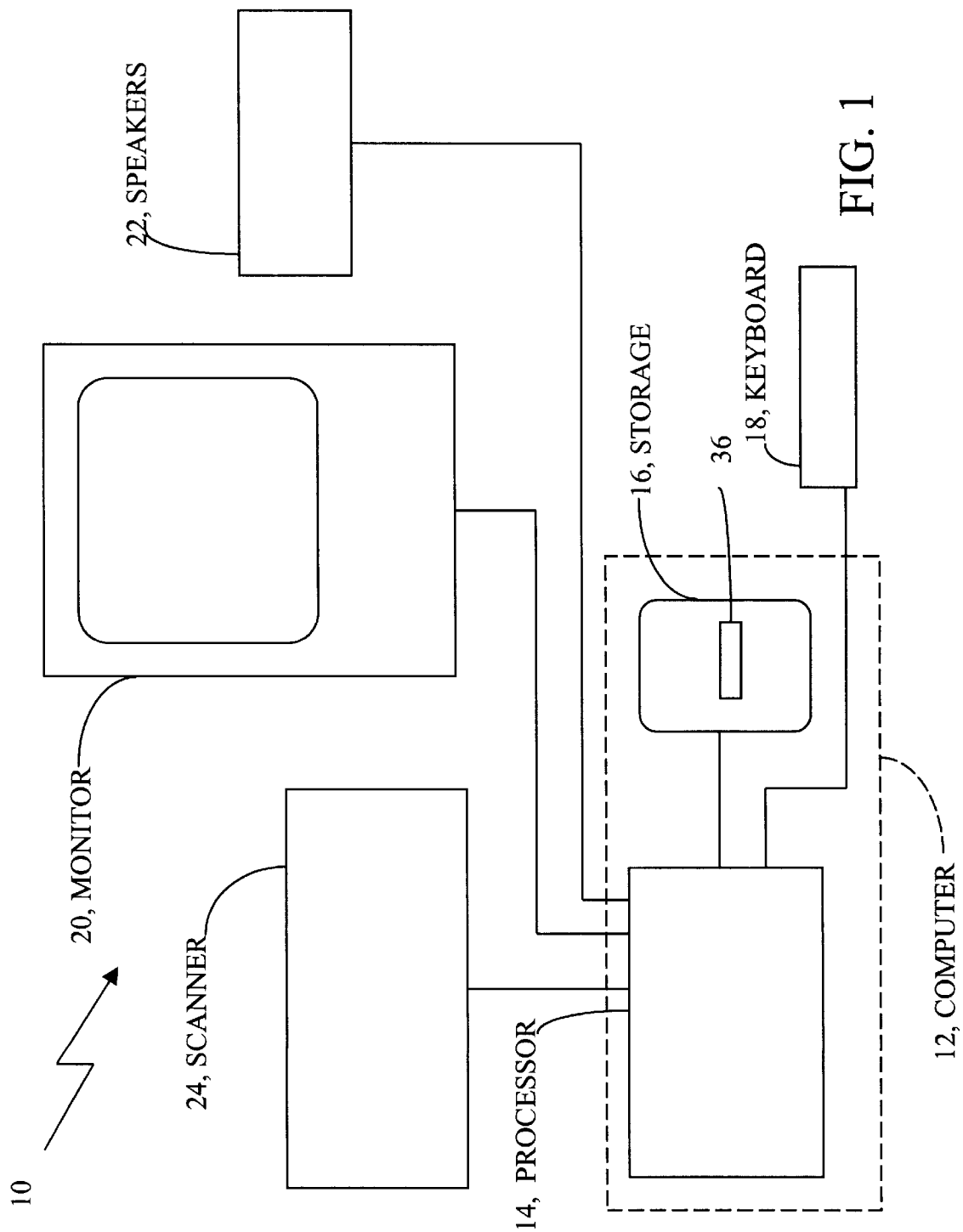
FIG. 1 is a block diagram view of a reading system.

Referring now to FIG. 1, a reading machine 10 is shown to include a computer system 12. The computer system 12 is generally a personal computer or can alternatively be another type of computer and typically includes a central processor unit (not shown) that is part of a processor 14. A preferred implementation of the processor 14 is a Pentium® based system from Intel Corporation, Santa Clara, Calif., although other processors could alternatively be used. In addition to the CPU, the processor includes main memory, cache memory and bus interface circuits (not shown). The computer system 12 includes a mass storage element 16, here typically the hard drive associated with personal computer systems.

The reading system 10 further includes a standard PC type keyboard 18, a sound card (not shown), a monitor 20 as well as speakers 22, a pointing device such as a mouse 19 and a scanner 24 all coupled to various ports of the computer system 10 via appropriate interfaces and software drivers (not shown). The computer system 12 here operates under a WindowsNT® Microsoft Corporation operating system although other systems could alternatively be used.

Resident on the mass storage element 16 is image display and conversion software 30 (FIG. 2) that controls the display of a scanned image provided from scanner 24. In addition, the software 30 permits the user to control various features of the reader by referencing the image representation of the document displayed by the monitor.

Figure 2:
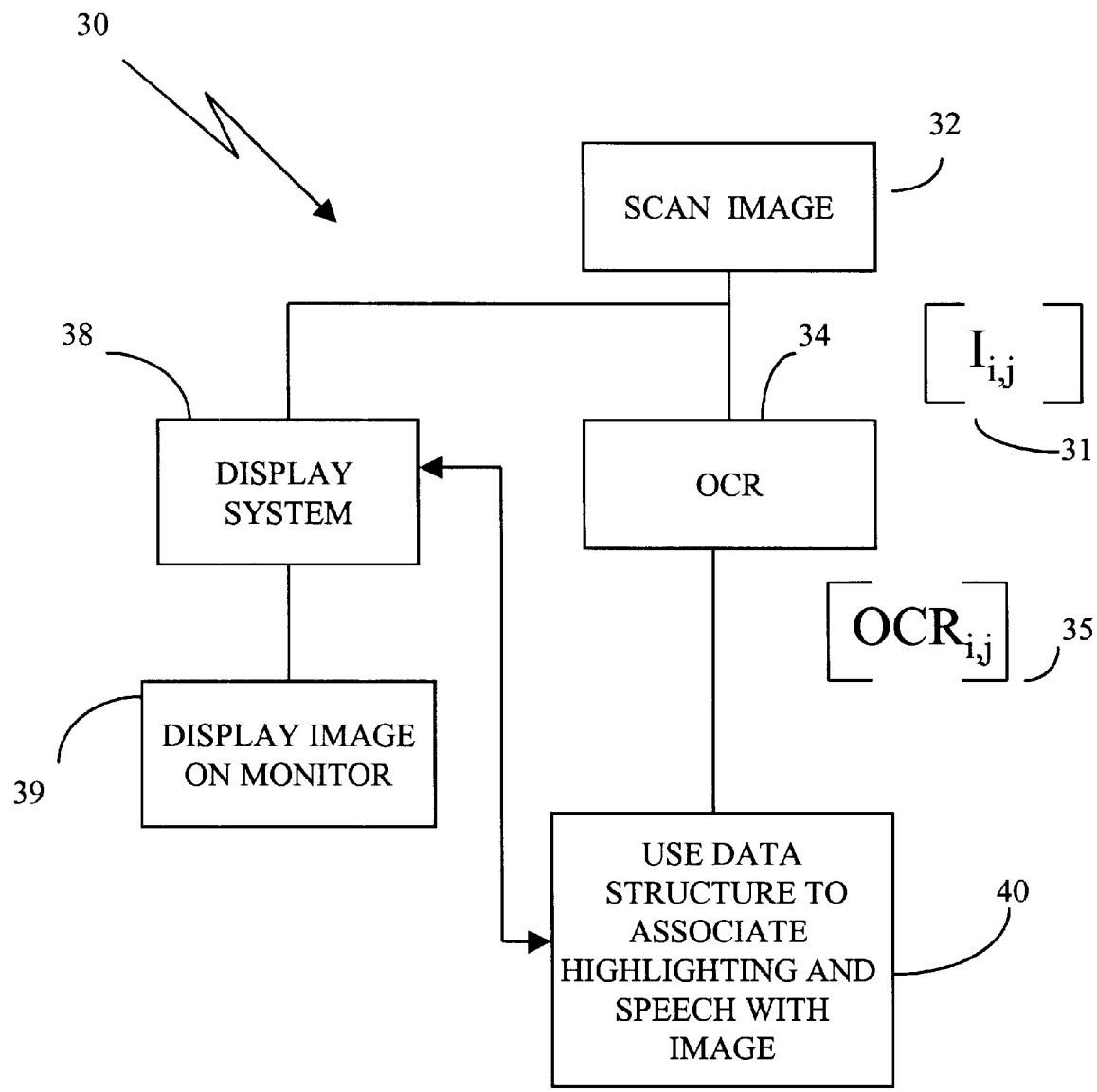
FIG. 2 is a flow chart showing steps used in displaying a scanned image representation of a document for use in the reading system of FIG. 1.

Referring now to FIG. 2, the image display and conversion software 30 scans an input document to provide an image file (step 32). In general the input document is scanned in a conventional manner and produces an image file 31 which is fed to an optical character recognition (OCR) module 34. The OCR module 34 uses conventional optical character recognition techniques on the data provided from the scanned image 32 to produce an output data structure 35. Alternatively, image-like representations can be used as a source such as a stored bitmapped version of a document.

The image file 31 is also fed to a display system 38 which in a conventional manner processes the image file to permit it to be displayed 39 on the monitor. As shown, the text file 35 provides an input along with other commands driven by the operating system (not shown) to a module 40 which is used to associate user initiated actions with an image representative of a scanned document. In addition, both the image file 31 and the text file 35 are stored in the reading system for use during the session and can be permanently stored for latter use. The files are stored using generally conventional techniques common to WindowsNT® or other types of operating systems. A preferred technique for the image display and conversion software 30 is described in a copending application Ser. No. 08/883,686 filed on Jun. 27, 1997, U.S. Pat. No. 5,875,428, entitled READING SYSTEM DISPLAYING SCANNED IMAGES WITH DUAL HIGHLIGHTS by Raymond C. Kurzweil and incorporated herein by reference.

Figure 3:
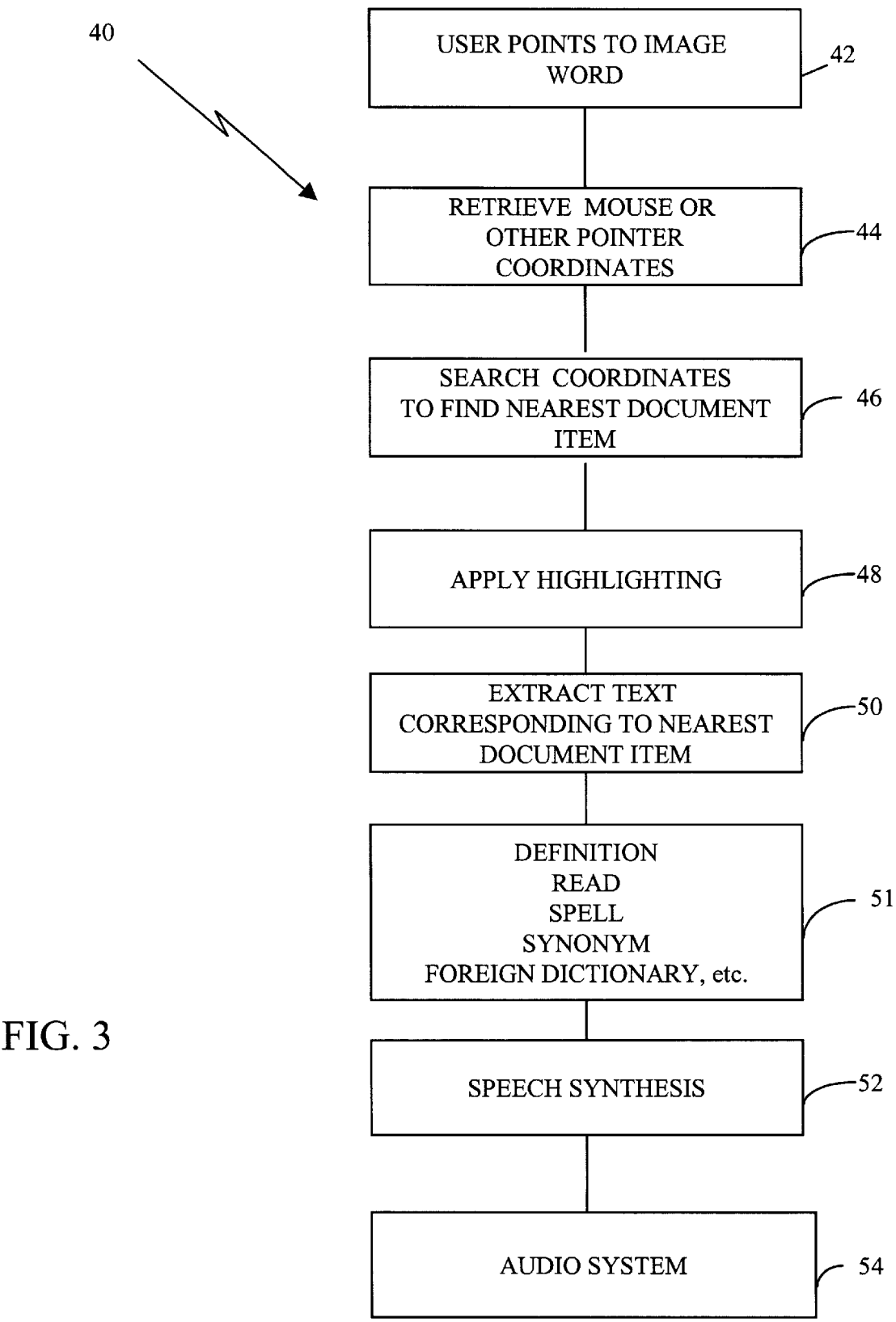
FIG. 3 is a flow chart showing steps used to associate user selected text on the displayed image representation to OCR generated text to permit voice synthesis and highlighting of the image representation.

Referring now to FIG. 3, the user controls operation of the reading system 10 with reference to the image displayed on the monitor 20 as shown by the software module 40.

A user can initiate reading of the scanned document at the beginning of the document by selecting a reading mode. Alternatively, the user can have the document start reading from any point in the document by illustratively pointing 42 to the image representation of an item from the scanned document displayed on the monitor. The document item can be the actual image representation of the scanned document rather than the conventional text file representation. The item can be a single word of text, a line, sentence, paragraph, region and so forth. The user activates a feature to enable the reading machine to generate synthesized speech associated with the selected image representation of the document item. For purposes of explanation, it will be assumed that the document item is a word.

Preferred searching 46 techniques are described in the above pending application.

After the nearest word or nearest document item has been determined 46 or 46', highlighting is applied 48 to an area associated with the item or word. The text corresponding to the nearest document item is also extracted 50. The software will call 51 one of several possible routines to provide an enrichment feature for the reading system 10. These routines can be accessed by a button or a feature on a pull-down menu of a window displayed the on the reading machine display. For example, the user can request a definition of a word, and call a dictionary program to have the word read aloud. The user can have the current word spelled, or have the reading system provide a synonym for the current word, or can look up a translation of the current word in a foreign dictionary, and so forth.

A talking speller feature can be enabled by use of a control or by selecting it from a pull down menu. In response to the call 51 is provided a text representation of an element. This element may be the word that was retrieved 42 or material corresponding to the definition of the word, the spelling of the word, and so forth.

The text representation is fed to a speech synthesizer 52 to produced electrical signals corresponding to speech. The electrical signals are fed to the audio system 54 to produce speech corresponding to the nearest document item while the monitor 20 displays the item and highlighting is applied to the item.

Figure 4:
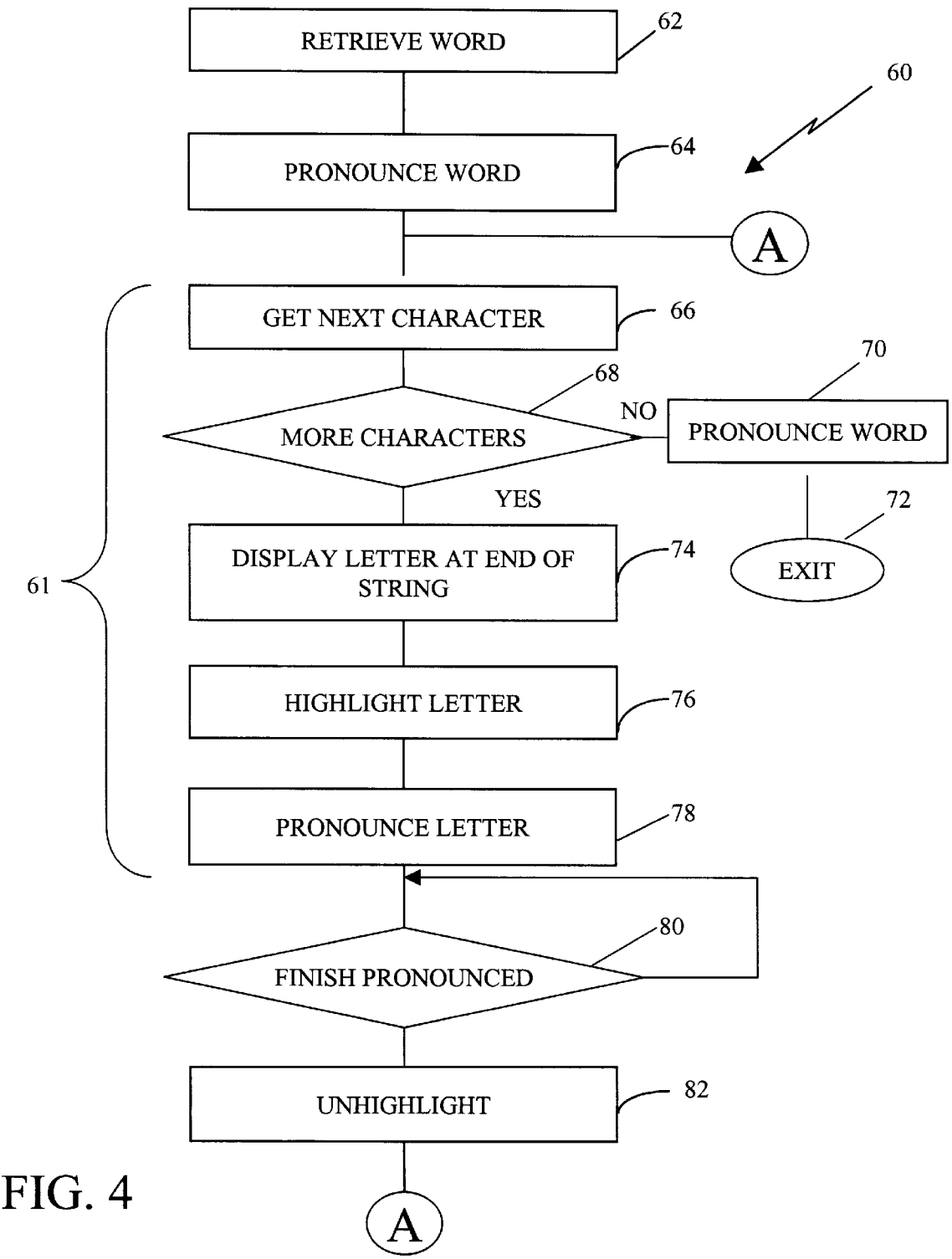
FIG. 4 is a flow chart showing a process to provide a talking speller with highlighting.

Referring now to FIG. 4, a talking speller process 60 particularly adapted for use by people with dyslexia includes retrieving 62 a word which a user desires to have spelled. The talking speller process 60 will send the text corresponding to the word to the speech synthesizer 52 to permit the reading machine 10 to pronounce the word 64. The talking speller process 60 enters a routine 61 to spell the word for the user. The process 60 retrieves the next character in the word 66 or, if it is the first character, the first character in the word and checks 68 for more characters. If there are no more characters, the process again send text corresponding to the word to the speech synthesizer 52 to permit the reading machine 10 to pronounce the word at 70 and exits 72.

If there are more characters left in the word, the process 61 will display 74 the retrieved character at the end of the string of characters or if it is the first letter of the word as the first letter in the string. The process will highlight 76 the retrieved character that was displayed 74. Text corresponding to the retrieved character will be sent to the speech synthesizer 52 to permit the reading machine 10 to pronounce 78 the retrieved character. The process 61 waits until the retrieved character has been completely pronounced 80 such as by waiting a predetermined time or by receiving an interrupt from the speech synthesizer, before unhighlighting the letter 82 and returning to get 66 the next character in the string.

The letter can be highlighted with a first transparent color. Alternatively, however other highlighting indicia can be used such as bold text, font style or size changes, italics, boxing in the letter, and underlining the letter. In addition, combinations of these other indicia with or without colors could be used. It should be noted that single or dual highlighting can be used and can apply distinct, transparent colors to selected portions of the displayed document. Alternatively, however other highlighting indicia can be used such as bold text, font style or size changes, italics, boxing in selected text, and underlining. In addition, combinations of these other indicia with or without colors could be used.

This talking speller feature on reading machines assists people with dyslexia by reinforcing the appearance of the letters one at a time in the string as the letters are being pronounced by the speller 60. This may improve the learning capabilities of such persons. This process can be extended to work with the other enrichment features mentioned above. For example, if the user requests a synonym of a word can have the process spell it and highlight it a letter at a time. The talking speller can display the letters one at a time and highlight them in a separate window that is produced by the system 30 and it can highlight the word as it appears in the original document currently displayed by the system 30. The display can be an image representation or the like in a text-based representation.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for having a reading machine spell a word comprises:

retrieving a word to be spelled;

displaying the first character of the word on a display while applying a highlighting indicia to the character;

synthesizing speech for the character to have the reading machine pronounce the displayed letter of the word, unhighlighting the displayed letter of the word; and retrieving a subsequent letter of the word.

2. The method of claim 1 further comprising synthesizing speech corresponding to the retrieved word to have the reading machine read the retrieved word to the user.

3. The method of claim 1 further comprising synthesizing speech after retrieving the word to permit the reading machine to read the retrieved word aloud to the user and, after determining there are no further characters in the word, synthesizing the word to have the reading machine read the retrieved word to the user.

4. The method of claim 1 wherein displaying displays a text representation of the word.

5. The method of claim 4 wherein displaying displays a text representation of a letter of the word.

6. The method of claim 1 wherein displaying displays an image representation of the word.

7. The method of claim 1 wherein the word is highlighted a letter at a time in a display of the current document.

8. The method of claim 1 wherein the word is highlighted a letter at a time in a separate window.

* * * * *